W. E. WILSON.
HEATER FOR AUTOMOBILE RADIATORS AND ENGINES.
APPLICATION FILED MAY 13, 1920.
1,414,539.
Patented May 2, 1922.
2 SHEETS—SHEET 1.
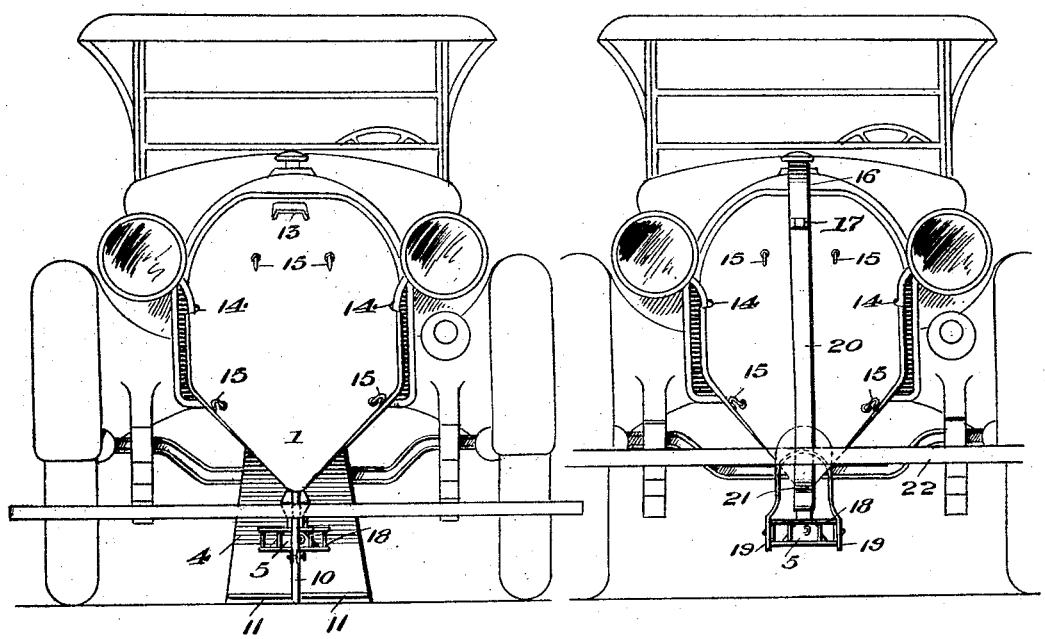
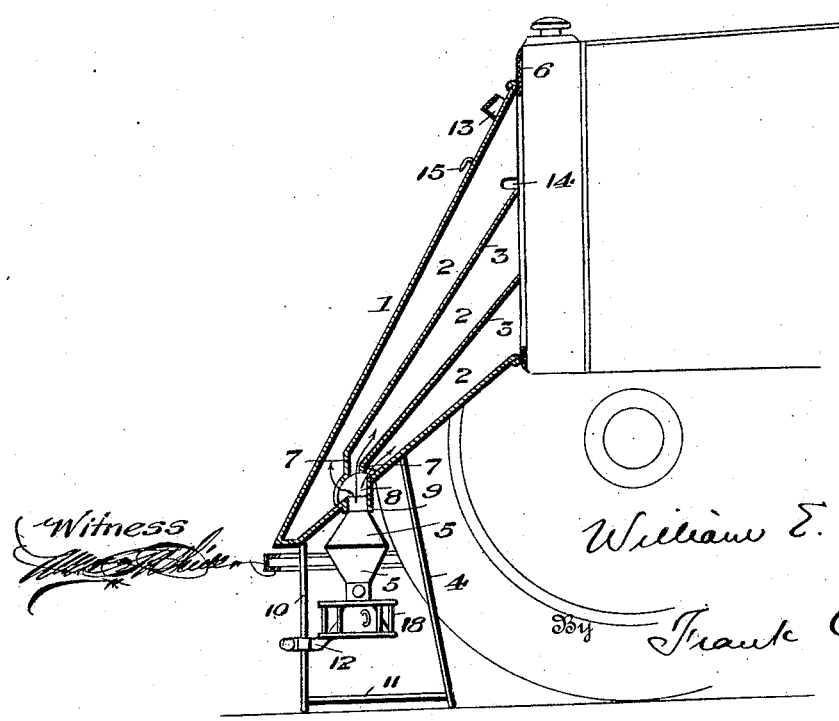

W. E. WILSON.
HEATER FOR AUTOMOBILE RADIATORS AND ENGINES.
APPLICATION FILED MAY 13, 1920.
1,414,539.
Patented May 2, 1922.
2 SHEETS—SHEET 2.
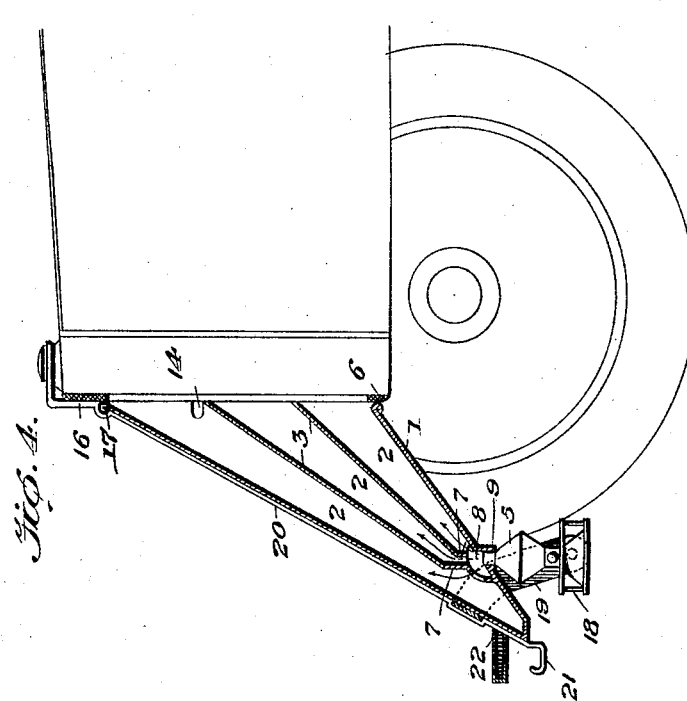
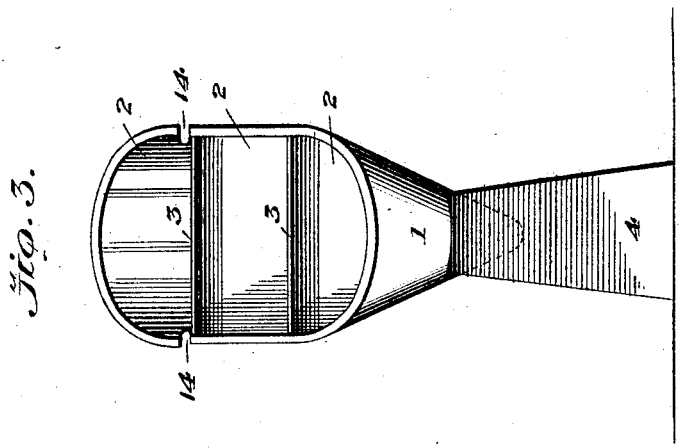
Witness
Inventor
William E. Wilson
By Frank C. Gore
His Attorney

UNITED STATES PATENT OFFICE.

WILLIAM E. WILSON, OF EVANSVILLE, INDIANA.

HEATER FOR AUTOMOBILE RADIATORS AND ENGINES.

1,414,539. Specification of Letters Patent. Patented May 2, 1922.

Application filed May 13, 1920. Serial No. 380,973.

*To all whom it may concern:*

Be it known that I, WILLIAM E. WILSON, a citizen of the United States, residing at Evansville, in the county of Vanderburg and State of Indiana, have invented certain new and useful Improvements in Heaters for Automobile Radiators and Engines, of which the following is a specification.

This invention relates to heaters for automobile radiators and engines, and has for its object, generally stated, the provision of a novel device which may be placed against the radiator of the automobile when in the garage or temporarily carried by the automobile, for the purpose of keeping the radiator or engine warm in order to prevent freezing.

Both embodiments of the invention comprise the same elements and combinations but they may vary, according as one or the other form is used, to meet the particular requirements of use. For instance, the form of the invention intended only to be placed against the radiator of the car when in the garage is adapted to be supported from the floor, whereas the form which is designed to be carried permanently by the car is hung or hinged so that it may be disposed against the radiator or swung forward and supported by the bumper according to whether the car is stationary or in motion. In both forms of the invention provision is made for the use of a heater such as may be conveniently heated by coal oil, carbide or electricity. When the heater is in the form of a lamp, provision is made for so supporting it that it will hang freely and retain an upright position on that form of the device which is intended to be permanently carried by the automobile. When a lamp is used as a heater in that form of the invention only intended to be employed in a garage, I provide a special bracket support.

In both forms of the invention the device is in the form of a cone having a plurality of partitions subdividing it into conduits for conducting the heat from the heating means to different parts of the radiator to insure proper distribution of the heat and especially to the lower part of the radiator.

Means may be provided on the heater for the attachment of the cover used for the hood.

The disclosure of the invention hereinafter given is to be considered only as illustrative thereof as modifications may be resorted to without departing from the essential principles thereof.

In the accompanying drawings,

Figure 1 is a front elevation showing the garage form of the heater applied to an automobile;

Fig. 2, is a vertical section of the heater shown in Fig. 1;

Fig. 3, is a detail view looking at the larger end of the heater;

Fig. 4, is a vertical section of that form of the heater which is carried by the automobile; and Fig. 5 is a front elevation thereof.

Reference is first to be had to Figs. 1, 2, 3 which show that form of the invention adapted to be used in a garage and to be applied to the car when not in use. The heater is made of sheet metal in the form of a hollow cone or funnel 1, which is internally subdivided into a plurality of compartments 2 by partitions 3 extending longitudinally of the heater shell 1. A combined guard and foot 4 serves the double purpose of supporting the device in position and that of preventing the flame from the lamp or heating means 5 having access to any near-by object, thus minimizing danger from fire. The edge of the mouth of the heater may be provided with a suitable packing 6 to properly seal the juncture of the device with the radiator and prevent the escape of the heat so that all of the heat will be directed through the radiator.

The lower ends of the partitions 3 are disposed angularly to their lengths as shown at 7 and they extend across the opening 8 through which heat is derived from the lamp or other heater 5 whose chimney or heat-discharging part is made to telescope with the collar 9 surrounding said opening.

Extending downwardly from the lower end of the shell 1 is a leg 10 which is connected by braces 11 to the shield 4. Adjustable up and down on the leg 10 is the lamp support 12 on which the lamp 5 rests, thus enabling the latter to be raised and lowered as necessary or desired. A suitable hand-hold 13 is provided on the shell 1 so that the device may be easily placed in position or removed. Notches 14 are provided to accommodate the rod which connects the headlights. Hooks or other suitable fastenings 15 are provided to be engaged by the laprobe or other cover which is used on the automobile hood when the car is at rest.

It is not necessary to provide means for engaging the laprobe or other cover for the hood in this form of the invention.

Referring to Figs. 4, 5 which disclose that form of the invention adapted to be carried by the car and let down when the automobile is at rest, the elements and combinations of parts are essentially the same as in the form intended to be used in the garage. The heater is, however, suitably suspended from the radiator as, for instance, by a hanger 16 hinged at 17 adapted to fit around the radiator cap or nipple. This hinge connection allows the heater 1 to rest firmly against the radiator. I do not limit myself to the particular hanger or suspending device disclosed. The shield 4 may be dispensed with in this form of the invention, as it is unnecessary. The heater or lamp 5 is carried by a support 18 which is preferably swiveled or hinged to the hangers 19 so that the lamp or heater will maintain an upright position regardless of the position of the cone. For the purpose of strengthening the shell 1, a rigid steel strip 20 extends lengthwise thereof and projects below the lower end of said shell as shown at 21 and is there provided with a suitable spring snap clip or attaching device by which it may be secured to the bumper 22 of the automobile when the car is in motion, thus holding the bottom of the shell 1 swung upwardly and away from the radiator and permitting air to have access to the latter. In this form of the invention there is the added advantage that the conical shape of the shell 1 reduces the air pressure on the front of the car.

When used on the car, the device may be enameled or painted the same color as the car so as to be inconspicuous. Being in the form of an attachment, when the device is removed in warm weather, no marks remain on the car.

In both forms of the invention the heat rising from the lamp or other suitable heater 5 is sub-divided by the partitions 3 and distributed through the compartments 2 to different sections or parts of the radiator, thereby insuring an even heating of the latter and a suitable flow backwardly around the engine.

What I claim is:—

1. A heater comprising a shell or casing which is adapted to be applied to the front of an automobile radiator provided with a plurality of heat conveying compartments open at their ends which face the radiator, respectively arranged to deliver heat into a given area of the radiator, and means for supplying heat to the said compartments.

2. A heater comprising a funnel shaped shell or casing which is adapted to be applied to the front of an automobile radiator provided with a plurality of heat conveying compartments extending lengthwise thereof and open at their ends which face the radiator and respectively arranged to deliver heat into different horizontal sections of the radiator from the lowest to the highest part thereof, and means for supplying heat to the compartments at the smaller end of the shell or casing.

3. A heater comprising a shell or casing which is adapted to be applied to the front of an automobile radiator, said casing having a plurality of independent compartments which are open at their ends which face the radiator and are respectively arranged to deliver heat into different sections comprising the entire area of the radiator, and means for supplying heat to the said compartments.

In testimony whereof I affix my signature.

WILLIAM E. WILSON.